United States Patent
Liang

(10) Patent No.: US 11,307,703 B2
(45) Date of Patent: Apr. 19, 2022

(54) METHOD FOR TRANSMITTING AND RECEIVING SIGNAL, PROCESSOR CHIP, ACTIVE STYLUS AND TOUCH SCREEN

(71) Applicant: SHENZHEN GOODIX TECHNOLOGY CO., LTD., Guangdong (CN)

(72) Inventor: Qiquan Liang, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/123,776

(22) Filed: Dec. 16, 2020

(65) Prior Publication Data

US 2021/0103374 A1  Apr. 8, 2021

Related U.S. Application Data

(63) Continuation of application No. PCT/CN2019/109487, filed on Sep. 30, 2019.

(51) Int. Cl.
*G06F 3/041* (2006.01)

(52) U.S. Cl.
CPC ................ *G06F 3/04162* (2019.05)

(58) Field of Classification Search
CPC .............. G06F 3/04162; G06F 3/0416; G06F 3/04164; G06F 3/041; G06F 3/0412; G06F 3/03545; G06F 2203/04101
See application file for complete search history.

(56) References Cited

U.S. PATENT DOCUMENTS

| | | |
|---|---|---|
| 2008/0029316 A1 | 2/2008 | Jaeger et al. |
| 2016/0209983 A1 | 7/2016 | Chen et al. |
| 2018/0081457 A1* | 3/2018 | Dai .............. G06F 3/04162 |

FOREIGN PATENT DOCUMENTS

| | | |
|---|---|---|
| CN | 102866792 A | 1/2013 |
| CN | 102902383 A | 1/2013 |
| CN | 105468170 A | 4/2016 |
| CN | 106293220 A | 1/2017 |

(Continued)

OTHER PUBLICATIONS

International Search Report for International Application No. PCT/CN2019/109485 dated Jun. 30, 2020.

(Continued)

*Primary Examiner* — Lisa S Landis
(74) *Attorney, Agent, or Firm* — Heslin Rothenberg Farley & Mesiti P.C.

(57) ABSTRACT

Some embodiments of the present disclosure provide a method for transmitting and receiving a signal, a processor chip, an active stylus, and a touch screen. The method for transmitting a signal includes: acquiring, based on detected pressure information, codes representing pressure information and used to detect tip positions, where the code includes n code bits, n being an integer greater than 1; generating n coded signals respectively corresponding to the n code bits; and transmitting each coded signal in the coded signals at the preset first or second frequency or prohibiting transmission of each coded signal in the coded signals, where the first frequency, the second frequency and prohibited transmission of the n coded signals relate to the pressure information.

19 Claims, 9 Drawing Sheets

(56) References Cited

FOREIGN PATENT DOCUMENTS

| CN | 107969152 A | 4/2018 |
|---|---|---|
| CN | 108235746 A | 6/2018 |
| CN | 108431741 A | 8/2018 |
| EP | 3477439 A1 | 5/2019 |
| WO | 2018049636 A1 | 3/2018 |

OTHER PUBLICATIONS

International Search Report for International Application No. PCT/CN2019/109487 dated Jun. 29, 2020.
Shenzhen Goodix Technology Co., Ltd., Extended European Search Report, EP 19932242.1, dated Jun. 28, 2021, 10 pgs.

* cited by examiner

METHOD FOR TRANSMITTING AND RECEIVING SIGNAL, PROCESSOR CHIP, ACTIVE STYLUS AND TOUCH SCREEN

CROSS-REFERENCE TO RELATED APPLICATIONS

The present application is a continuation of PCT Patent Application No. PCT/CN2019/109487, entitled "METHOD FOR TRANSMITTING AND RECEIVING SIGNAL, PROCESSOR CHIP, ACTIVE STYLUS AND TOUCH SCREEN", filed on Sep. 30, 2019, which is incorporated herein by reference in its entirety.

TECHNICAL FIELD

The present disclosure relates to signal processing technology, in particular to a method for transmitting and receiving a signal, a processor chip, an active stylus and a touch screen.

BACKGROUND

With the popularity of capacitive touch screens, capacitive active styli have been more and more widely used. When a user is using a capacitive active stylus, the capacitive touch screen detects the coded signal of the screen body and that of the active stylus in a time-division manner. In particular, the detection time of the screen body of the capacitive touch screen is the key factor affecting the contact reporting rate of the active stylus. A higher contact reporting rate indicates a faster response of the screen body to the writing of the active stylus. Users, while demanding better writing experience and touch experience from the active stylus, are imposing increasingly higher requirements for the contact reporting rate of the active stylus.

The inventor found that there are at least the following problems in existing technologies: a long time is needed to code coordinates and pressures in the existing coding method and the contact reporting rate is low, which degrades users' touch experience.

SUMMARY

An objective of some embodiments of the present disclosure is to provide a method for transmitting and receiving a signal, a processor chip, an active stylus and a touch screen. The active stylus can output more coordinates of tip positions at a unit of time, and the touch screen can detect more coordinates of tip positions at a unit of time, thus improving the contact reporting rate.

Embodiments of the present disclosure provide a method for transmitting a signal applied to active styli, which includes: acquiring, based on detected pressure information, codes representing pressure information and used to detect tip positions, where the codes includes n code bits, n being an integer greater than 1; generating n coded signals respectively corresponding to the n code bits, and transmitting each coded signal in the coded signals at a preset first or second frequency or prohibiting transmission of each coded signal in the coded signals, where the first frequency, the second frequency and prohibited transmission of n coded signals relate to the pressure information.

Embodiments of the present disclosure also provide a method for receiving a signal applied to touch screens, which includes: detecting, in sequence, n coded signals transmitted by the active stylus where the n coded signals have the preset first frequency, the second frequency or are prohibited to be transmitted; acquiring pressure information based on frequency and prohibited transmission of signals representing pressure information in n detected coded signals; and acquiring coordinates of tip positions based on amplitude information of signals used to detect tip positions in detected n coded signals.

Embodiments of the present disclosure also provide a processor chip to execute the described method for transmitting a signal.

Embodiments of the present disclosure also provide an active stylus that includes the described processor chip.

Embodiments of the present disclosure also provide a touch screen including at least one processor, and a memory connected and in communication with at least one processor. In particular, the memory stores instructions executable by the at least one processor, and the instructions, when executed by the at least one processor, cause the at least one processor to perform the described method for receiving a signal.

Compared to existing technologies, codes representing pressure information and used to detect tip positions are acquired based on detected pressure information in the embodiments of the present disclosure, coded signals respectively corresponding to n code bits in the code are generated, that is, n coded signals are acquired, and with respect to different codes, n coded signal are transmitted by a different transmitting method. For a binary code, there are two code values in each of the n code bits, and each of the n coded signals is transmitted at the preset first or second frequency (that is, a coded signal with code value 0 corresponding to the code bit is transmitted at the first frequency, and that with code value 1 is transmitted at the second frequency) to allow the touch screen to identify the code value of each code bit according to the frequency of the detected signal when the touch screen detects the coded signal, so that the pressure information can be transmitted, and the code bits representing pressure information can be used to detect tip positions. In this way, the coordinates of tip positions can be transmitted without extra code bits, and can be acquired by the touch screen during pressure information detection, which reduces detection time of the touch screen and allows the active stylus to transmit more coordinates of tip positions and the touch screen to detect more coordinates of tip positions at a unit of time, thus improving the contact reporting rate. For a ternary code, there are three code values in each of the n code bits, and each of the n coded signals representing the pressure information is transmitted at the preset first or second frequency, or is prohibited to be transmitted. In this way, when the pressure information is transmitted, higher pressure degrees can be represented by fewer code bits, thus shortening the time of transmitting pressure information to allow the active stylus to transmit more coordinates of tip positions at a unit of time, so as to improve the contact reporting rate.

In an example, a part of n code bits serve as n pressure code bits representing pressure information, and another part of the n code bits serve as a coordinate code bit used to detect tip position. This embodiment provides a specific method to set pressure code bits and coordinate code bits.

In an example, each coded signal used to detect tip positions in n coded signals is transmitted at the first or second frequency.

In an example, acquiring, based on detected pressure information, codes representing pressure information and used to detect tip position includes: acquiring, based on detected pressure information and pressing signals of function buttons, codes representing the pressure information and pressing signals and used to detect tip positions. In this embodiment, codes can also be used to transmit the pressing signals of function buttons.

In an example, any of the n code bits serves as a key code bit representing the pressing signal. This embodiment provides a specific method to set the key code bit.

In an example, the active stylus has two function buttons, the pressing signals of the function buttons correspond to the key code bit with different code values respectively. In this embodiment, a key code bit can transmit the pressing signals of two function buttons.

In an example, before acquiring, based on detected pressure information, the codes representing pressure information and used to detect tip positions, further including: in response to a synchronizing signals transmitted by the touch screen, acquiring the delay time from the synchronizing signal; start timing when the synchronizing signal ends, and entering the step of acquiring, based on detected pressure information, codes representing pressure information and used to detect tip positions when the timing length reaches a preset delay time. This embodiment provides a specific method to synchronize the active stylus and the touch screen.

In an example, the first frequency, the second frequency and prohibited transmission correspond to the pressure code bits with different code values.

In an example, the codes are ternary.

In an example, prohibited transmission corresponds to the pressure code bit with a ternary code value "0", the first frequency corresponds to the pressure code bit with a ternary code value "1", and the second frequency corresponds to the pressure code bit with a ternary code value "2".

In an example, two pressure code bits corresponding to coordinate codes are adjacent to each other in n pressure code bits. In this embodiment, two pressure code bits corresponding to coordinate codes are set to be adjacent to each other in n pressure code bits to facilitate to detect tip positions by the touch screen.

In an example, the n code bits further comprise a check code bit.

In an example, acquiring pressure information based on the frequency and prohibited transmission of signals representing pressure information in n detected coded signals includes: with respect to each signal representing pressure information, acquiring the code values of the code bits of the signal corresponding to pressure information based on the frequency and prohibited transmission of the signal. This embodiment provides a specific method to acquire pressure information based on the frequency and prohibited transmission of signals representing pressure information in the n detected coded signals.

In an example, the touch screen includes driving channels and sensing channels, where detecting, in sequence, n coded signals transmitted by the active stylus includes: detecting n coded signals in sequence by the driving channels and the sensing channels. This embodiment provides a specific method by which the touch screen detects n coded signals transmitted by the active stylus in sequence.

In an example, the driving channels include multiple driving electrodes, the sensing channel include multiple sensing electrodes, and the amplitude information includes the amplitude of signals detected by all driving electrodes and that detected by all sensing electrodes, where acquiring the coordinates of tip positions based on the amplitude information of the signals used to detect tip position in n detected coded signals includes: comparing an amplitude of the signal with the threshold value; if the amplitude of the signal is smaller than the threshold value, no transmission of the coded signals by the active stylus is determined; if the amplitude is larger than the threshold value, transmission of the coded signals by the active stylus is determined. With respect to signals used to defect tip positions, the driving electrodes corresponding to the signal with the maximum amplitude and the sensing electrodes corresponding to the signal with the maximum amplitude are used to calculate the coordinates of the tip position. This embodiment provides a specific method to acquire the coordinates of tip positions based on the amplitude information of the signals used to detect tip positions in detected coded signals.

In an example, acquiring coordinates of tip positions based on the amplitude information of the signals used to detect tip positions in n detected coded signals including: with respect to each signal used to detect tip positions, comparing the amplitude information of the signal at the first frequency and that of the signal at the second frequency. If the amplitude information of the signal at the first frequency exceeds that of the signal at the second frequency, the amplitude information of the signal at the first frequency is used to calculate the coordinates of the tip position. If the amplitude information of the signal at the second frequency exceeds that of the signal at the first frequency, the amplitude information of the signal at the second frequency is used to calculate the coordinates of the tip position. In this embodiment, signals at the frequency with greater amplitude information are used to calculate coordinates of the tip positions as they include less noise and enable higher accuracy.

BRIEF DESCRIPTION OF THE DRAWINGS

One or more embodiments are illustrated by figures in the corresponding drawings attached, which do not constitute a qualification to the embodiments. Elements labeled the same reference numbers in the drawings are similar elements, and, unless otherwise specified, figures in the drawings attached do not constitute a proportionality limitation.

DETAILED DESCRIPTION

For a better understanding of objectives, technical solutions and advantages, the present disclosure is further explained in detail below with reference to the accompanying drawings and embodiments. It should be understood that specific embodiments described herein are only used to explain rather than limit the present disclosure.

Figure 1:
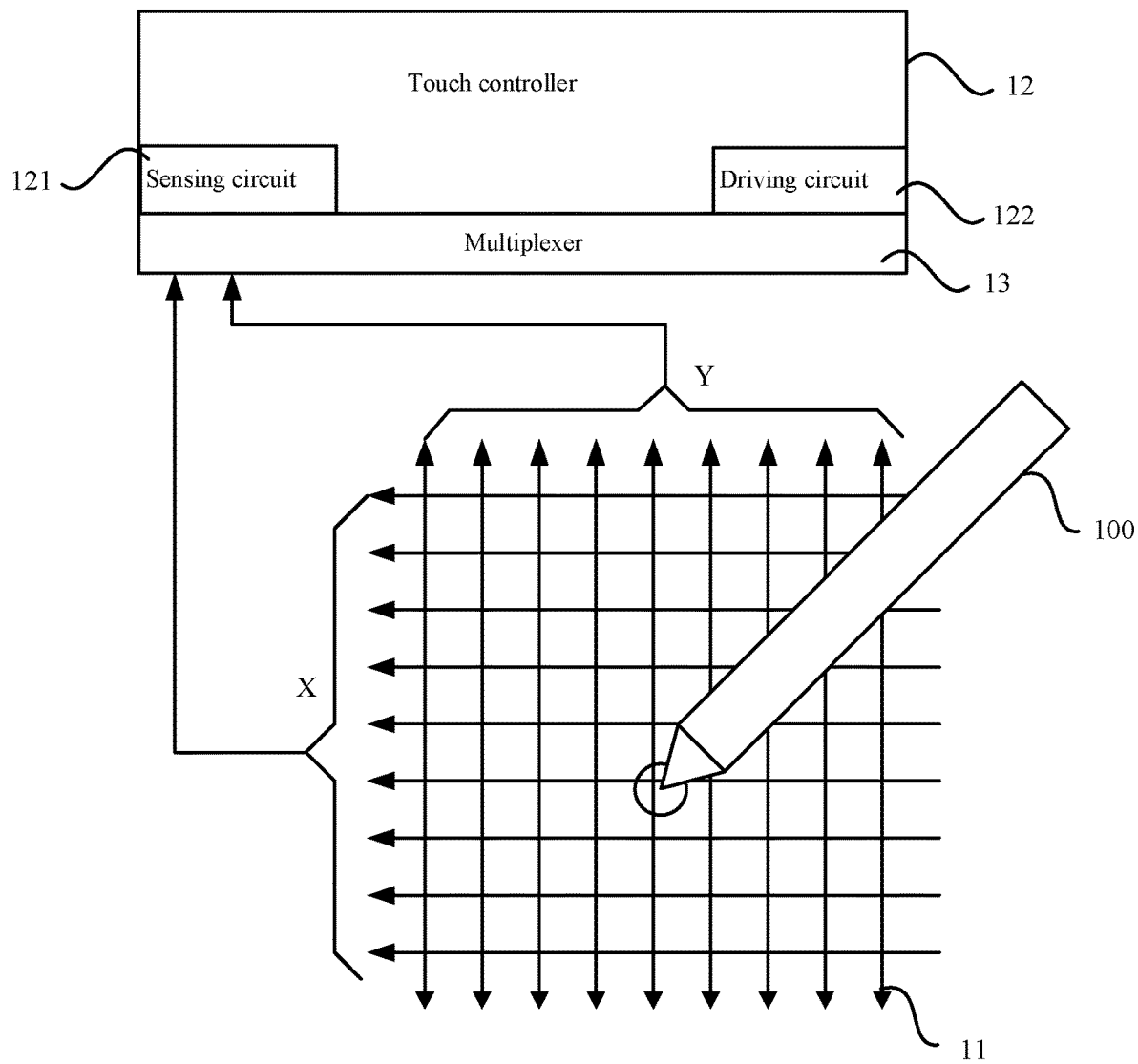
FIG. 1 is a schematic structural diagram of communication between an active stylus and a touch screen in a first embodiment of the present disclosure.

The first embodiment of the present disclosure relates to a method for transmitting a signal applied to active styli, which is used to communicate with touch screens, as shown in FIG. 1. The active stylus can be a capacitive active stylus.

The following is an introduction to the method in which the active stylus communicates with the touch screen.

The touch screen includes a sensing layer 11, a touch controller 12 and a multiplexer 13. The sensing layer 11 includes driving channels Y and sensing channel X, which, via the multiplexer 13, are connected to the touch controller 12 that includes a sensing circuit 121 and a driving circuit 122. In the timing sequence of screen-end detection of the touch screen, the touch screen synchronizes and detects a signal of the active stylus within one cycle T. The number of cycles T completed by the touch screen at a unit of time is considered as the contact reporting rate of the screen end.

In particular, in the process of detecting the signal of the active stylus, the touch controller 12 controls the driving channel Y and the sensing channel X to be connected to the sensing circuit 121 via the multiplexer 13. When a tip of the active stylus 100 transmits a signal to the touch screen, there is coupling capacitance between the active stylus and the driving channels Y and the sensing channels X, so that the signal is coupled to the driving channels Y and the sensing channel X via the coupling capacitance, and then is detected by the sensing circuit 121. During the detection, the touch screen only receives signals, and transmits no driving signals.

Figure 2:
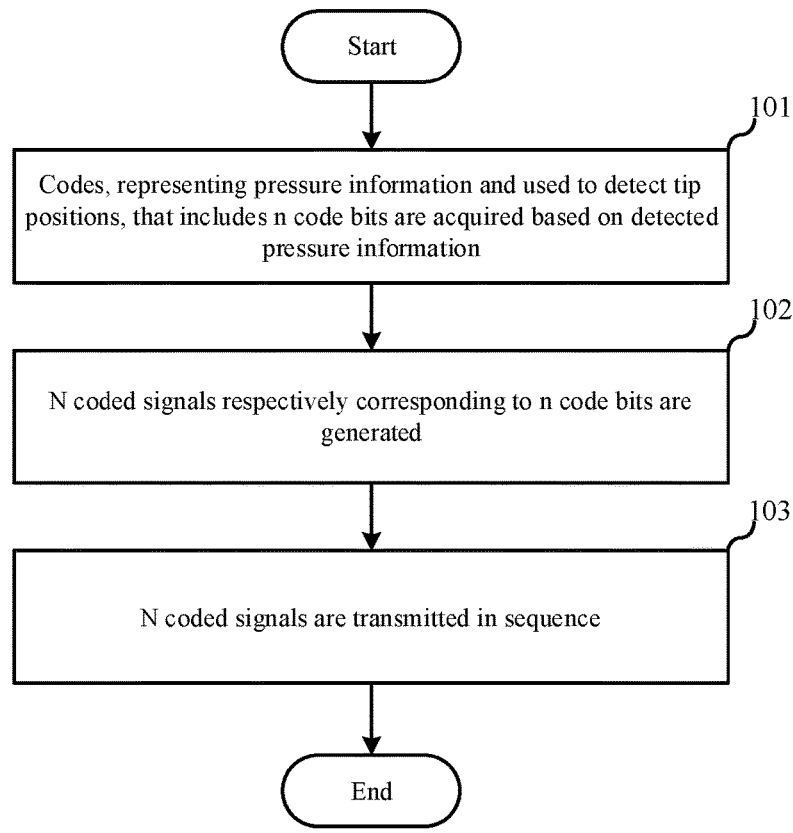
FIG. 2 is a detailed flow chart of a method for transmitting a signal in the first embodiment of the present disclosure.

A detailed flow chart of the method for transmitting a signal in the embodiment is as shown in FIG. 2.

In step 101, codes, representing pressure information and used to detect tip positions, that include n code bits are acquired based on detected pressure information.

Specifically, when the active stylus 100 is in contact with the touch screen, the active stylus 100 measures the pressure information of the tip at each time point via pressure sensor-like components therein. Such pressure information is then coded to acquire a pressure code in a preset coding method, and the pressure code is added into a coordinate code used to detect tip positions to acquire codes representing pressure information and used to detect tip positions that include n code bits, where n is an integer greater than 1. The pressure code and the coordinate code are coded in the same coding method.

In this embodiment, the code can be a binary code or a ternary code, depending on the preset coding method in the active stylus 100. The following is a detailed introduction with reference to specific coding methods.

Figure 3:
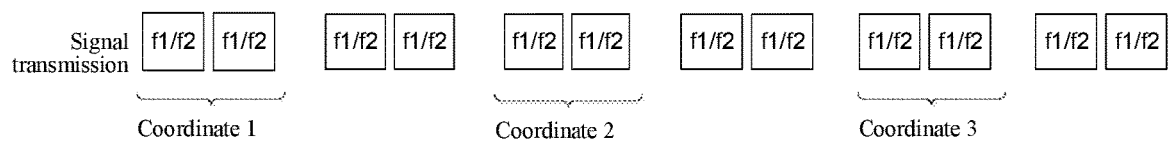
FIG. 3 is a schematic diagram of transmitting three coordinate codes in a binary code including 12 code bits in the first embodiment of the present disclosure.
Figure 4:
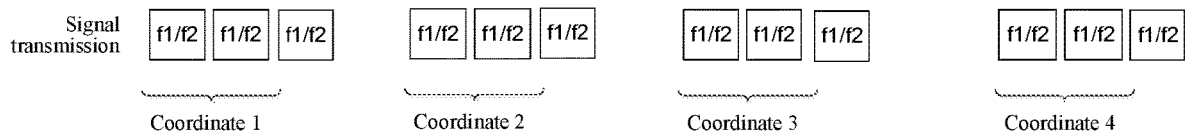
FIG. 4 is a schematic diagram of transmitting four coordinate codes in the binary code including 12 code bits in the first embodiment of the present disclosure.

When the coding method is binary, the active stylus 100 first converts measured pressure information into binary information to acquire a binary code including n code bits that also serve as pressure code bits representing pressure information. Each coordinate code used to detect tip positions corresponds to coordinates of a tip position, and any two pressure code bits in n pressure code bits are reused as coordinate code bits, so that a coordinate may be decoded from a coordinate code at the screen end as long as a decoding method is set at the screen end accordingly. After all pressure code bits respectively corresponding to coordinate codes are set, binary codes including n code bits are acquired, which are the binary codes representing pressure information and used to detect tip positions. Any two code bits in n pressure code bits constitute a coordinate code, for example, the pressure code bit 1 and pressure code bit 3 in n pressure code bits are set as the coordinate code in sequence. Preferably, two pressure code bits corresponding to a coordinate code may be set as two pressure code bits adjacent to each other in n pressure code bits to facilitate the touch screen 200 to detect the coordinates of tip positions, which also improves accuracy of the detected coordinates as there is no intermediate code bit between the above two pressure code bits. For example, when the active stylus 100 outputs a binary code including 12 code bits, as shown in FIG. 3, the binary code is set to have 6 coordinate code bits to transmit 3 coordinate codes used to detect tip positions, so that the touch screen can calculate out 3 coordinates. As shown in FIG. 4, the binary code is set to have 8 coordinate code bits to transmit 4 coordinate codes used to detect tip positions, so that the touch screen can calculate out 4 coordinates. It should be noted that the coordinate code is only a coded signal output by the active stylus, and the active stylus does not calculate the coordinate. A voltage signal with a fixed value is output by the active stylus to the touch screen via the coupling capacitance between the active stylus and the touch screen to allow the touch screen to calculate the coordinates of the active stylus based on the coordinate code.

Figure 5:
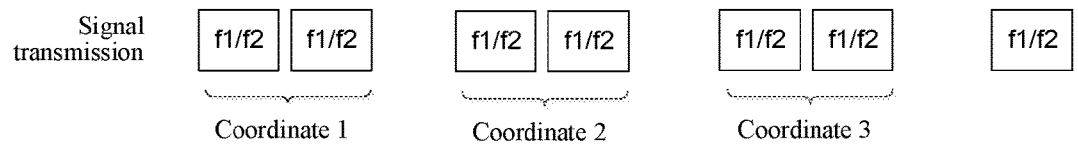
FIG. 5 is a schematic diagram of transmitting three coordinate codes in the binary code including 7 code bits in the first embodiment of the present disclosure.
Figure 6:
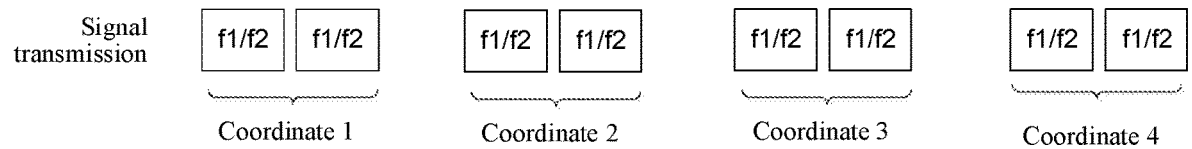
FIG. 6 is a schematic diagram of transmitting four coordinate codes in the binary code including 8 code bits in the first embodiment of the present disclosure.

In this embodiment, if n is an odd integer, the acquired binary code can be set to have (n−1)/2 coordinate codes at most, as shown in FIG. 5. For example, when n=7, the binary code can be set to have 3 coordinate codes at most. If n is an even integer, the acquired binary code can be set to have n/2 coordinate codes at most, as shown in FIG. 6. For example, when n=8, the binary code can be set to have 4 coordinate codes at most. It should be noted that FIG. 5 and FIG. 6 exemplify that two pressure code bits in the same coordinate code are adjacent.

Figure 7:
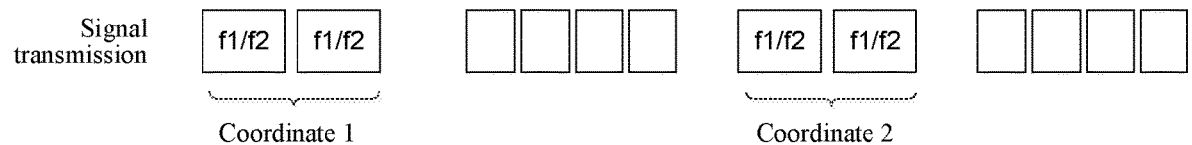
FIG. 7 is a schematic diagram of transmitting two coordinate codes in the ternary code including 12 code bits in the first embodiment of the present disclosure.

When the coding method is ternary, the active stylus 100 first converts the measured pressure information into ternary information to acquire a ternary code including k code bits that also serve as pressure code bits representing pressure information. Each coordinate code used to detect tip positions corresponds to the coordinates of a tip position, and the coordinate code including two coordinate code bits is inserted into a ternary code including k code bits, where a sum of k plus twice the number of the coordinate codes is n, so as to acquire a ternary code including n code bits. That is, some of the n code bits serve as pressure code bits representing pressure information and the rest serve as coordinate codes used to detect tip positions. In this case, k is an integer greater than 0. As shown in FIG. 7, when n=12, the number of pressure code bits is 8, and that of coordinate codes is 2. It should be noted that FIG. 7 exemplifies that two pressure code bits in the same coordinate code in a ternary code are adjacent.

It should be noted that during the coordinate detection of the touch screen 200, two coordinate code bits in one coordinate code should be respectively detected by the driving channels Y and the sensing channels X to acquire the coordinates of a tip position.

It should also be noted that a value of n may be set according to a pressure degree that the active stylus 100 needs to reach. In the case of binary coding, each code bit has two states, i.e., code value 0 or 1. N code bits in a binary code represent pressure information, and the first frequency F1 and the second frequency F2 correspond, respectively, to code values of all code bits representing pressure information. For example, when the first frequency corresponds to pressure code bits with code value "0", and the second frequency corresponds to pressure code bits with code value "1", the pressure degree that the active stylus 100 may reach can be expressed as $2^n$. When the active stylus 100 needs to reach a pressure degree of 64, n should be set as 6, when it needs to reach a pressure degree of 256, n should be set as 8, and when it needs to reach a pressure degree of 4,096, n should be set as 12. In the case of ternary coding, each code bit has three states, i.e., code value 0, 1 or 2. K code bits in a ternary code are used to transmit pressure information, with the first frequency, second frequency and prohibited transmission corresponding to pressure code bits with different code values, respectively. For example, when prohibited transmission corresponds to pressure code bits representing pressure information whose ternary code value is "0", the first frequency corresponds to pressure code bits representing pressure information whose ternary code value is "1" and the second frequency corresponds to pressure code bits representing pressure information whose ternary code value is "2", the pressure degree that the active stylus 100 may reach may be expressed as $3k$. When the active stylus 100 needs to reach a pressure degree of 81, k should be set as 4, when it needs to reach a pressure degree of 243, k should be set as 5, and when it needs to reach a pressure degree of 5,651, k should be set as 8.

In step 102, n coded signals respectively corresponding to n code bits are generated.

Specifically, the coded signals transmitted by the tip of the active stylus 100 may be of square wave, sine wave or triangle wave. Coded signals corresponding to code bits are set according to preset types of the coded signals corresponding to code bits to acquire the coded signals corresponding to code bits in codes, that is, to acquire n coded signals in sequence corresponding to codes.

In step 103, n coded signals are transmitted in sequence.

Figure 8:
FIG. 8 is a schematic diagram of transmitting the coded signal corresponding to binary code 101010 in the first embodiment of the present disclosure.

Specifically, two transmission frequencies, the first frequency f1 and the second frequency f2, are preset in the active stylus 100. When a code is binary, each of the n coded signals is transmitted at the preset first frequency or the preset second frequency, and the first frequency and second frequency of the n coded signals relate to pressure information, as shown in FIG. 3 to FIG. 6. In particular, for a binary code, the code value of each code bit is 1 or 0, so it can be preset that the first frequency f1 corresponds to code value 1, and the second frequency f2 corresponds to code value 0. For example, as shown in FIG. 8, when a binary code 101010 representing pressure information corresponds to a decimal value representing the pressure value, the frequencies of the coded signals corresponding to the code bits transmitted by the active stylus 100 is f1, f2, f1, f2, f1 and f2, in sequence.

Figure 9:
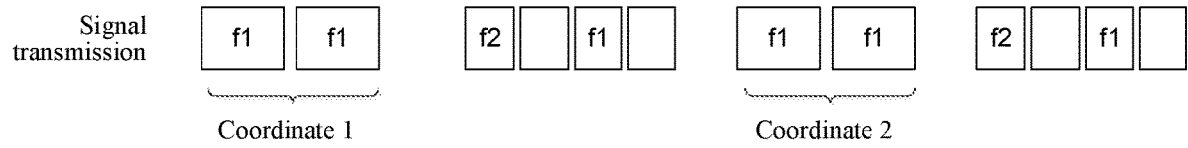
FIG. 9 is a schematic diagram of transmitting the coded signal corresponding to ternary code 20102010 in the first embodiment of the present disclosure.

When the code is a ternary code, with respect to code bits representing pressure information, each coded signal representing pressure information in n coded signals is transmitted at the preset first frequency or the preset second frequency, or prohibited to transmit, where the first frequency, second frequency and prohibited transmission of the coded signals relate to pressure information. In addition, each coded signal used to detect tip positions in n coded signals is transmitted at the first or second frequency. In particular, with respect to a ternary code, the code value of each code bit is 2, 1 or 0, so it can be preset that prohibited transmission of coded signals (to be realized by setting coded signals at a low voltage level) corresponds to code value 0, the first frequency f1 corresponds to code value 1, and the second frequency f2 corresponds to code value 2. For example, as shown in FIG. 9, a ternary code includes two coordinate codes, each of which has two coordinate code bits adjacent to each other and includes 4 pressure code bits representing pressure information after each coordinate code. When a ternary code whose pressure code bits are 20102010 that represents pressure information corresponds to a decimal value representing the pressure value, the frequencies of the coded signals corresponding to the coordinate code bits in the coordinate codes output during signal transmission are f1 or f2 (f1 is taken as an example in the drawing), and the methods to output pressure code bits are f2, prohibited transmission, f1, prohibited transmission, f2, prohibited transmission, f1, and prohibited transmission, in sequence. It should be noted that the above is only an example, and prohibited transmission of the coded signals may correspond to code value 1 or 2 without any restriction.

Compared to existing technologies, codes representing pressure information and used to detect tip positions are acquired based on the detected pressure information in this embodiment, and n coded signals respectively corresponding to n code bits in the code are generated, that is, n coded signals are acquired, and with respect to different codes, n coded signal are transmitted by a different transmitting method. For a binary code, there are two code values in each of the n code bits, and each of the n coded signals is transmitted at the preset first or second frequency (that is, a coded signal with code value 0 corresponding to the code bit is transmitted at the first frequency, and that with code value 1 is transmitted at the second frequency) to allow the touch screen to identify the code value of each code bit according to the frequency of the detected signal when the touch screen detects the coded signal, so that the pressure information can be transmitted, and the code bits representing pressure information can be used to detect tip positions. In this way, the coordinates of tip positions can be transmitted without extra code bits, and can be acquired by the touch screen during pressure information detection, which reduces detection time of the touch screen and allows the active stylus to transmit more coordinates of tip positions and the touch screen to detect more coordinates of tip positions at a unit of time, thus improving the contact reporting rate. For a ternary code, there are three code values in each of the n code bits, and each of the n coded signals representing the pressure information is transmitted at the preset first or second frequency, or is prohibited to be transmitted. In this way, when the pressure information is transmitted, higher pressure degrees can be represented by fewer code bits, thus shortening the time of transmitting pressure information to allow the active stylus to transmit more coordinates of tip positions at a unit of time, so as to improve the contact reporting rate.

A second embodiment of the present disclosure relates to a method for receiving a signal. This embodiment differs from the first embodiment mainly in that: it provides a specific method to synchronize signals between the active stylus and the touch screen.

Figure 10:
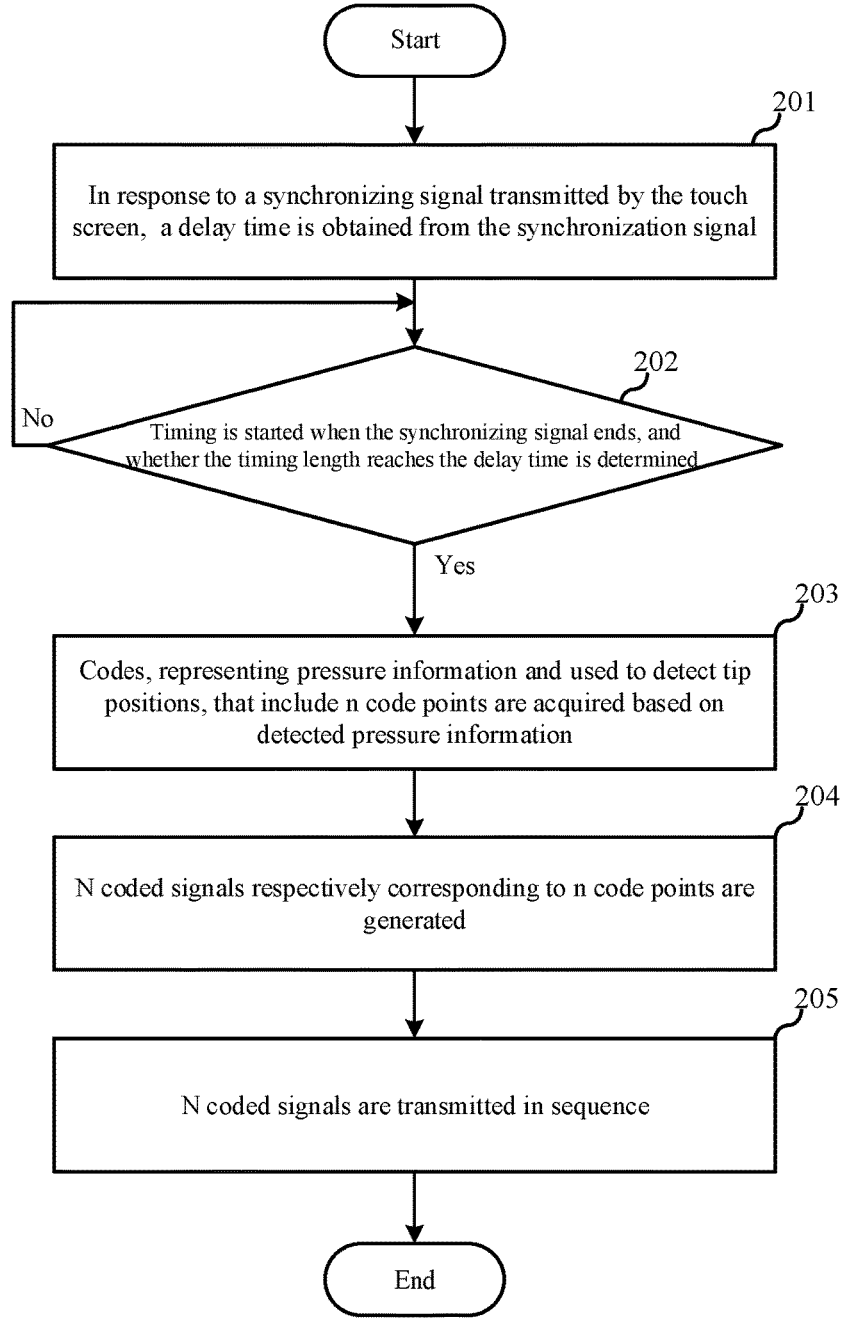
FIG. 10 is a detailed flow chart of a method for transmitting a signal in the second embodiment of the present disclosure.

A detailed flow chart of the method for receiving a signal in the embodiment is as shown in FIG. 10.

Step 203 to step 205 are almost the same as step 101 to step 103, so no repeated description is made here. Step 201 and step 202 are the main differences, which are detailed as follows:

In step 201, in response to a synchronizing signal transmitted by the touch screen, a delay time is obtained from the synchronizing signal, timing is started when the synchronizing signal ends, and whether a timing length reaches the delay time is determined. If it reaches, step 203 is performed; otherwise, step 201 is repeated.

Figure 11:
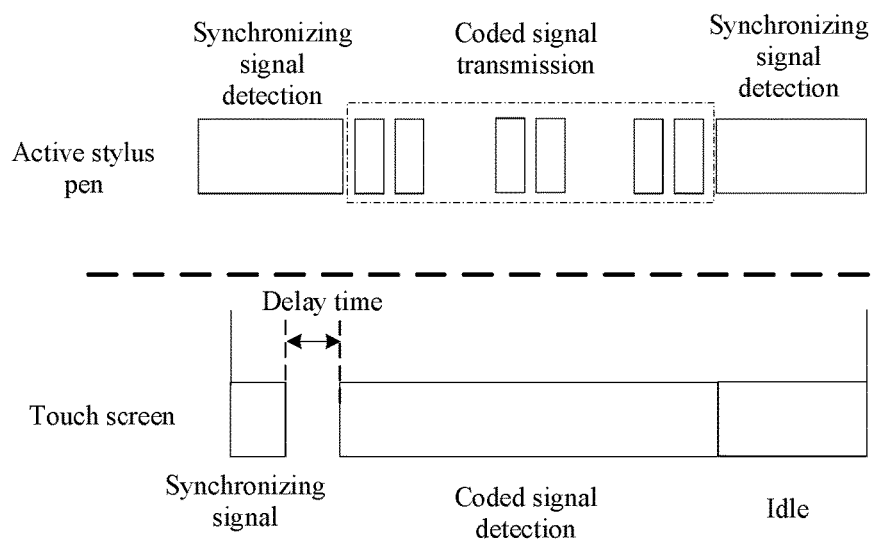
FIG. 11 is a schematic diagram of synchronization between an active stylus and a touch screen in the second embodiment of the present disclosure.

Specifically, as shown in FIG. 11, the touch screen 200 transmits synchronizing signals periodically and, after the synchronizing signals ends and then a preset delay time is reached, the touch screen 200 starts to detect coded signals from the active stylus 100 and, once a coded signal transmitted by the active stylus is detected, that the active stylus 100 is approaching is determined and the touch screen 200 establishes a handshake with the active stylus 100. Before coding, the active stylus 100 keeps detecting synchronizing signals. When detecting a synchronizing signal transmitted by the touch screen 200, the active stylus 100 analyzes the synchronizing signal, acquires an ending time of the synchronizing signal from its characteristics, starts timing when the synchronizing signal ends, and determines whether the timing length reaches the preset delay time. If yes, step 203 to step 205 are performed to transmit the coded signals, while the touch screen 200, after transmitting synchronizing signals, detects the coded signals after the preset delay time, so as to synchronize itself with the active stylus 100. In particular and in general, a gap time is set after every two code bits are transmitted, so that the number of code bits can be determined at the screen end. If the timing length fails to reach the delay time, the timing continues.

Figure 12:
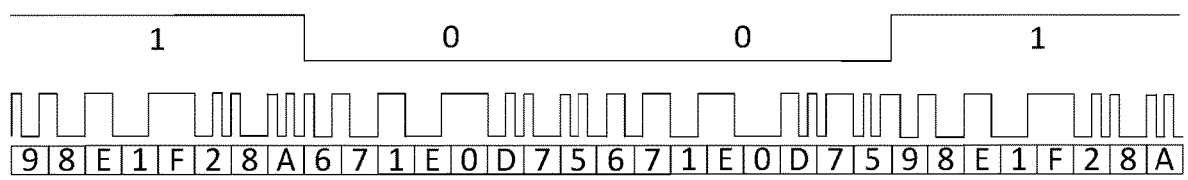
FIG. 12 is a schematic diagram of a synchronizing signal of 1001 pulse series in the second embodiment of the present disclosure.

A synchronizing signal in this embodiment is composed of multiple pulses. Specifically, a synchronizing signal can be expressed as a binary number with multiple digits, and each binary number can be expressed as a coding pulse with multiple digits, for example, a coding pulse with 32 digits, the time occupied by each pulse may be set as a 1 us. For another example, the binary number 1 may be expressed as 0x98E1F28A and the binary number 0 may be expressed as 0x671E0D75. FIG. 12 represents a synchronizing signal of the 1001 pulse series. In this embodiment, a synchronization error between the active stylus 100 and the touch screen 200 may be down to ±2 us through decoding of the pulse series.

Compared with the first embodiment, this embodiment provides a specific method to synchronize signals between the active stylus and the touch screen.

A third embodiment of the present disclosure relates to a method for receiving a signal. This embodiment differs from the first embodiment mainly in that: codes in this embodiment also represent pressing signals of function buttons.

Figure 13:
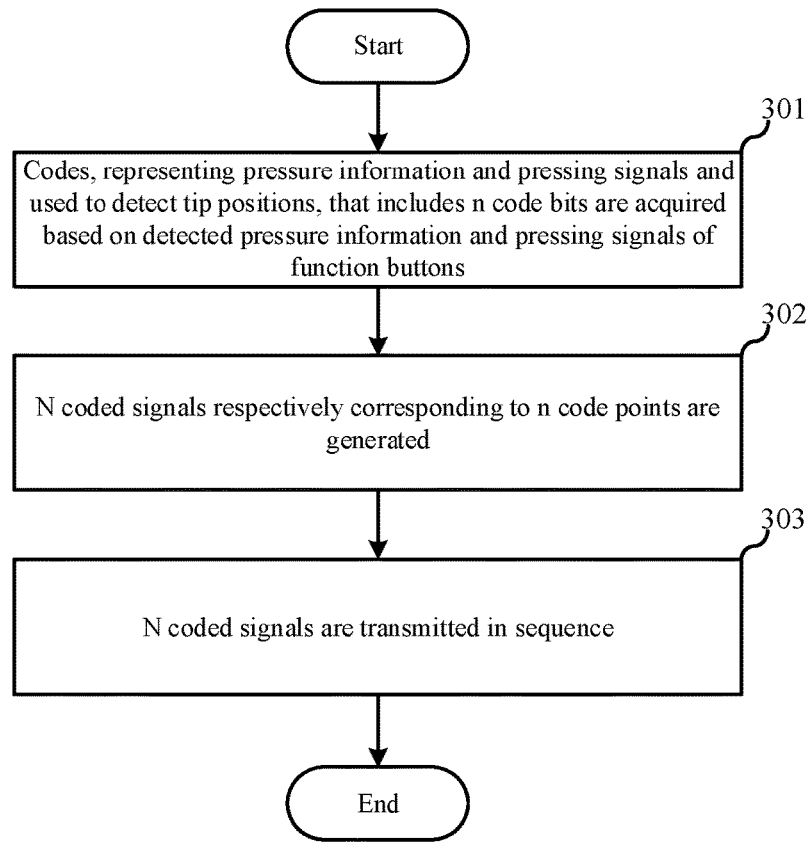
FIG. 13 is a detailed flow chart of a method for transmitting a signal in a third embodiment of the present disclosure.

A detailed flow chart of the method for transmitting a signal in the embodiment is as shown in FIG. 13.

Step 302 and step 303 are almost the same as step 102 and step 103, so no repeated description is made here. They differ mainly in that:

In step 301, codes representing pressure information and pressing signals and used to detect the tip positions that include n code bits are acquired based on detected pressure information and pressing signals of the function buttons.

Specifically, the active stylus 100 includes at least one function button and may acquire codes representing pressure information and pressing signals and used to detect tip positions, where any one in n code bits may be set as a key code bit representing pressing signals. In this embodiment, the last in n code bits in the codes may be set as a check code bit whose code value is a check value of the code values of n−1 code bits before the check code bit. The check value may be calculated by an odd check method, an even check method or a cumulative sum method. The following are specific examples to illustrate.

Figure 14:
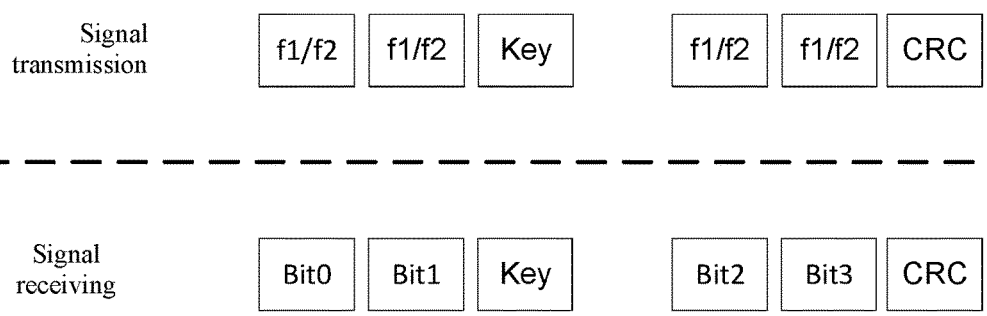
FIG. 14 is a schematic diagram of a key code bit and a check code bit in a binary code in the third embodiment of the present disclosure.

For a binary code, the third code bit is the key code bit Key, the sixth is the check code bit CRC, and the code value of CRC is the check value of bit0 to bit3 and the Key, as shown in FIG. 14.

Figure 15:
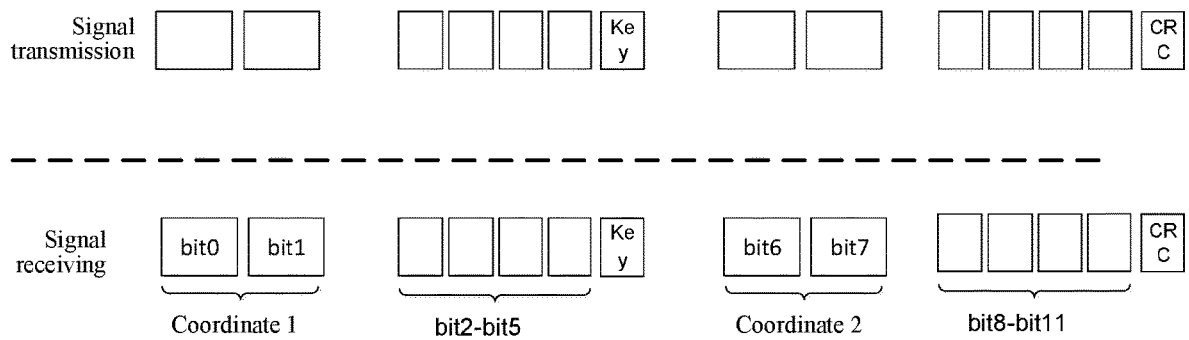
FIG. 15 is a schematic diagram of a key code bit and a check code bit in a ternary code in the third embodiment of the present disclosure.

For a ternary code, the seventh code bit is the key code bit Key, the fourteenth is the check code bit CRC, and the code value of CRC is the check value of bit0 to bit11 and the Key, as shown in FIG. 15.

In one example, the active stylus 100 includes two function buttons, the pressing signals of which may be set to correspond to key code bits with different code values. For example, in the case that the two function buttons are Key 1 and Key 2, when Key 1 is pressed and its pressing signal corresponds to the key code bit with code value 1, the coded signal corresponding to the key code bit with code value 1 is transmitted at the first frequency, and when Key 2 is pressed and its pressing signal corresponds to the key code bit with code value 0, the coded signal corresponding to the key code bit with code value 0 is transmitted at the second frequency.

Compared with the first embodiment, codes in this embodiment also represent the pressing signals of function buttons, so as to transmit the pressing signals of function buttons at the same time. It should be noted that this embodiment may also be regarded as an improvement of the second embodiment to achieve the same technical effect.

A fourth embodiment of the present disclosure relates to a method for receiving a signal applied to touch screens, which is used to detect the coded signals transmitted by the active stylus in the method for transmitting a signal in the first embodiment when the touch screen is in a stage of detecting signals of the active stylus.

Figure 16:
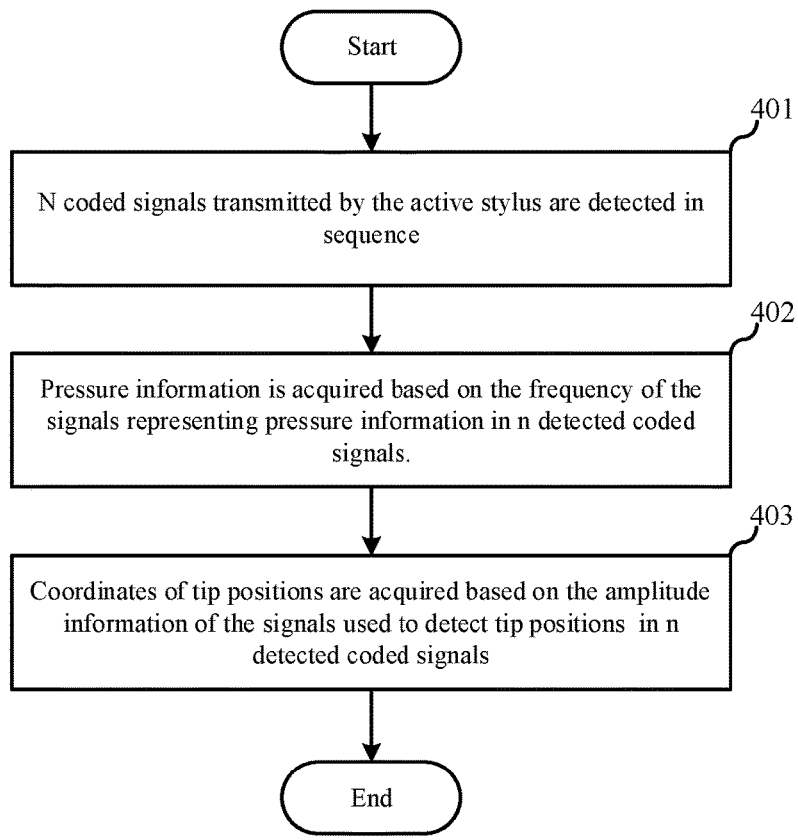
FIG. 16 is a detailed flow chart of a method for transmitting a signal in a fourth embodiment of the present disclosure.

A detailed flow chart of the method for receiving a signal in the embodiment is as shown in FIG. 16.

In step 401, n coded signals transmitted by the active stylus are detected in sequence.

Figure 17:
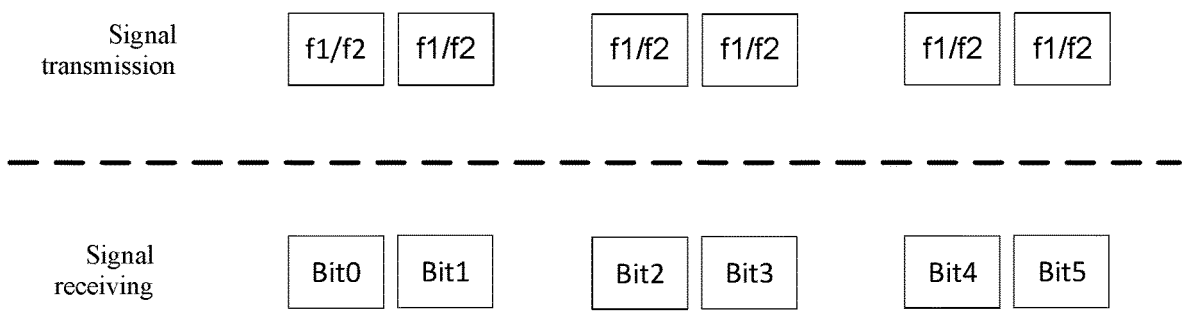
FIG. 17 is a schematic diagram of detecting 6 coded signals using 6 detection time slices in the fourth embodiment of the present disclosure.

Specifically, as shown in FIG. 1, the touch Screen 200 includes the driving channel Y and the sensing channel Y. As shown in the first embodiment, when the code is binary, coded signals respectively corresponding to code bits with different code values have the preset first or second frequency, and when the code is ternary, coded signals corresponding to pressure code bits with different code values have the first or second frequency or are prohibited to transmit, and coded signals corresponding to coordinate code bits used to detect tip positions have the first or second frequency. Details of the above can refer to the first embodiment, so they will not be repeated here. The touch screen 200 may detect n coded signals according to n detection time slices that have been preset, with each of the time slices corresponding to the driving channel Y or the sensing channel X. In other words, the touch screen 200 detects n coded signals corresponding to the codes transmitted by the active stylus 100 in sequence by the driving channel Y and the sensing channel X. For each coordinate code, two coordinate code bits corresponding to the coordinate code are detected by the driving channel Y and the sensing channel X, respectively, while pressure code bits and other code bits are detected in sequence by the driving channel Y or the sensing channel X. As shown in FIG. 17, when starting detection, the touch screen 200 detects 6 coded signals continuously using 6 detection time slices (bit0 to bit5 in FIG. 17). A length of the detection time slice may be equal to a length of a time slice of the coded signals. For example, the length of the time slice of the coded signals is 100 us, and the length of the detection time slice is also 100 us.

Figure 18:
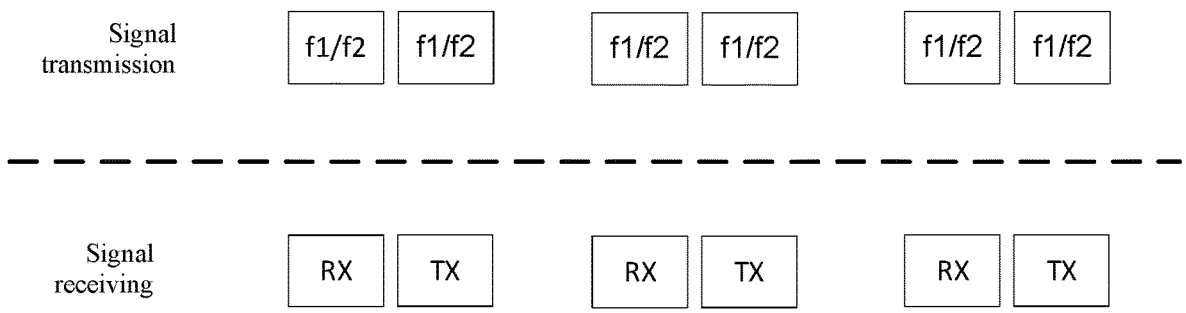
FIG. 18 is a schematic diagram of alternately detecting 6 coded signals of the touch screen with driving channels and sensing channels in the fourth embodiment of the present disclosure.

For each coordinate code, two coordinate code bits corresponding to the coordinate code need be detected by the driving channel Y and the sensing channel X, respectively. As shown in FIG. 18, when two coordinate code bits corresponding to the coordinate code are adjacent in the code, the driving channel Y (TX in the drawing) and the sensing channel X (RX in the drawing) may be set to detect alternately n coded signals in sequence.

In step 402, pressure information is acquired based on the frequency of the signals representing pressure information in n detected coded signals.

Figure 19:
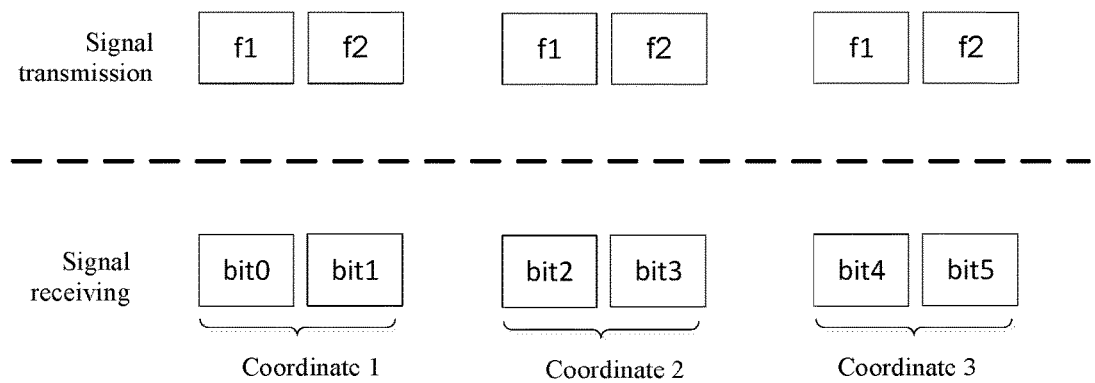
FIG. 19 is a schematic diagram of transmitting a signal in a binary code by the active stylus and screen-end detection in the fourth embodiment of the present disclosure.
Figure 20:
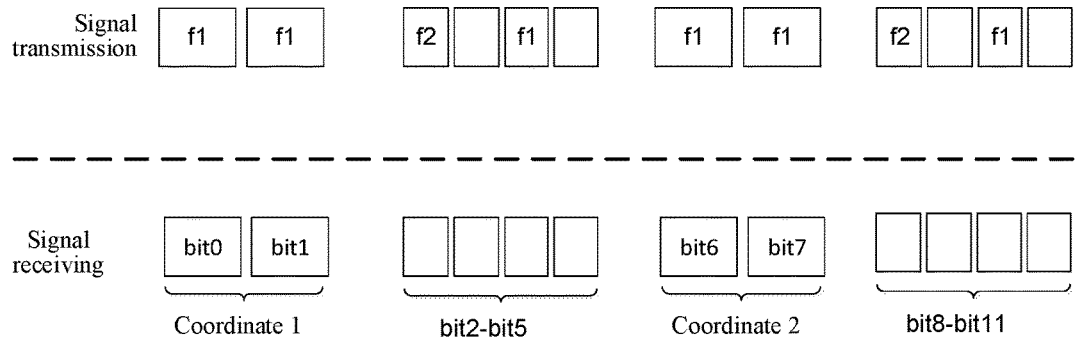
FIG. 20 is a schematic diagram of transmitting a signal in a ternary code by the active stylus and screen end detection in the fourth embodiment of the present disclosure.

Specifically, correspondence between the frequency and the code value is preset in the touch screen 200, which is the same as that preset in the active stylus 100, so with respect to each signal representing pressure information, the code value of the code bit corresponding to pressure information in the signal is acquired based on the frequency of the signal to acquire the code value of each code bit corresponding to pressure information in the code. In particular, in the case of a binary code, the first frequency F1 may be preset to correspond to code value 1 and the second frequency F2 may be preset to correspond to code value 0 in the touch screen 200, as shown in FIG. 19. When the frequencies of signals detected in each detection time slice are f1, f2, f1, f2, f1 and f2, the binary code 101010 transmitted by the active stylus 100 may be acquired, so that such a code may be converted to a decimal code representing pressure information of the tip position of the active stylus 100 on the touch screen 200. In the case of a ternary code, prohibited transmission may be preset to correspond to code value 0, the first frequency F1 to code value 1 and the second frequency F2 to code value 2, in the touch screen 200. As shown in FIG. 20, when the frequencies of signals detected in each detection time slice are f2, prohibited transmission, f1, prohibited transmission, f2, prohibited transmission, f1 and prohibited transmission, the ternary code 20102010 transmitted by the active stylus 100 may be acquired, so that such a code may be converted to a decimal code representing pressure information of the tip position of the active stylus 100 on the touch screen 200. After acquiring pressure information of the tip position of the active stylus 100 on the touch screen 200, the touch screen may present different stroke effects according to the pressure information to provide users better experience.

In step 403, the coordinates of tip positions are acquired based on amplitude information of the signals used to detect tip position in n detected coded signals.

Specifically, a coordinate code used to detect tip positions is preset in the active stylus 100 and the touch screen 200, as well as detection time slices used to detect coordinate code in the touch screen 200. As shown in FIG. 19, code bits 1 and 2, 3 and 4, and 5 and 6, are used to transmit 3 coordinate codes, and detection time slices bit0 and bit1, bit2 and bit3, and bit4 and bit5, are used to detect 3 coordinate codes, respectively. As shown in FIG. 20, code bits 1 and 2, and 7 and 8, are used to transmit 2 coordinate codes, and detection time slices bit0 and bit1, and bit6 and bit7, are used to detect 2 coordinate codes, respectively. For each coordinate code, when the touch screen 200 detects two signals corresponding to two coordinate code bits of the coordinate code using two corresponding detection time slices, the amplitude information of the two signals may be acquired by such detection by the driving channel Y and the sensing channel X, so as to compare an amplitude with the threshold value. If the amplitude of the signal is smaller than the threshold value, no transmission of the coded signals by the active stylus is determined. If the amplitude of the signal is larger than the threshold value, transmission of the coded signals by the active stylus is determined. Based on such amplitude information, the coordinates of the tip position corresponding to the coordinate code may be acquired. Specifically, the driving channel Y includes multiple driving electrodes, and the sensing channel includes multiple sensing electrodes. With respect to the two signals corresponding to one coordinate code, the amplitude information of one of the two signals detected by the driving channel Y includes the amplitude of each signal corresponding to each driving electrode, the amplitude information of one of the two signals detected by the sensing channel Y includes the amplitude of each signal corresponding to each sensing electrode. The greater of the signal indicates a closer distance between the tip of the active stylus and the electrode. On this basis, the driving electrode corresponding to the signal with the greatest amplitude is selected from multiple driving electrodes and the sensing electrode corresponding to the signal with the greatest amplitude is selected from multiple sensing electrodes to calculate the coordinates of the tip position corresponding to a coordinate code. For example, when the driving channel Y includes 10 driving electrodes and the sensing channel includes 10 sensing electrodes, a coordinate system with the top left corner as the origin may be formed. If the third driving electrode and the fourth sensing electrode correspond to the signals with the greatest amplitude, the touch screen will calculate the coordinates of the active stylus in the centroid method accordingly.

Figure 21:
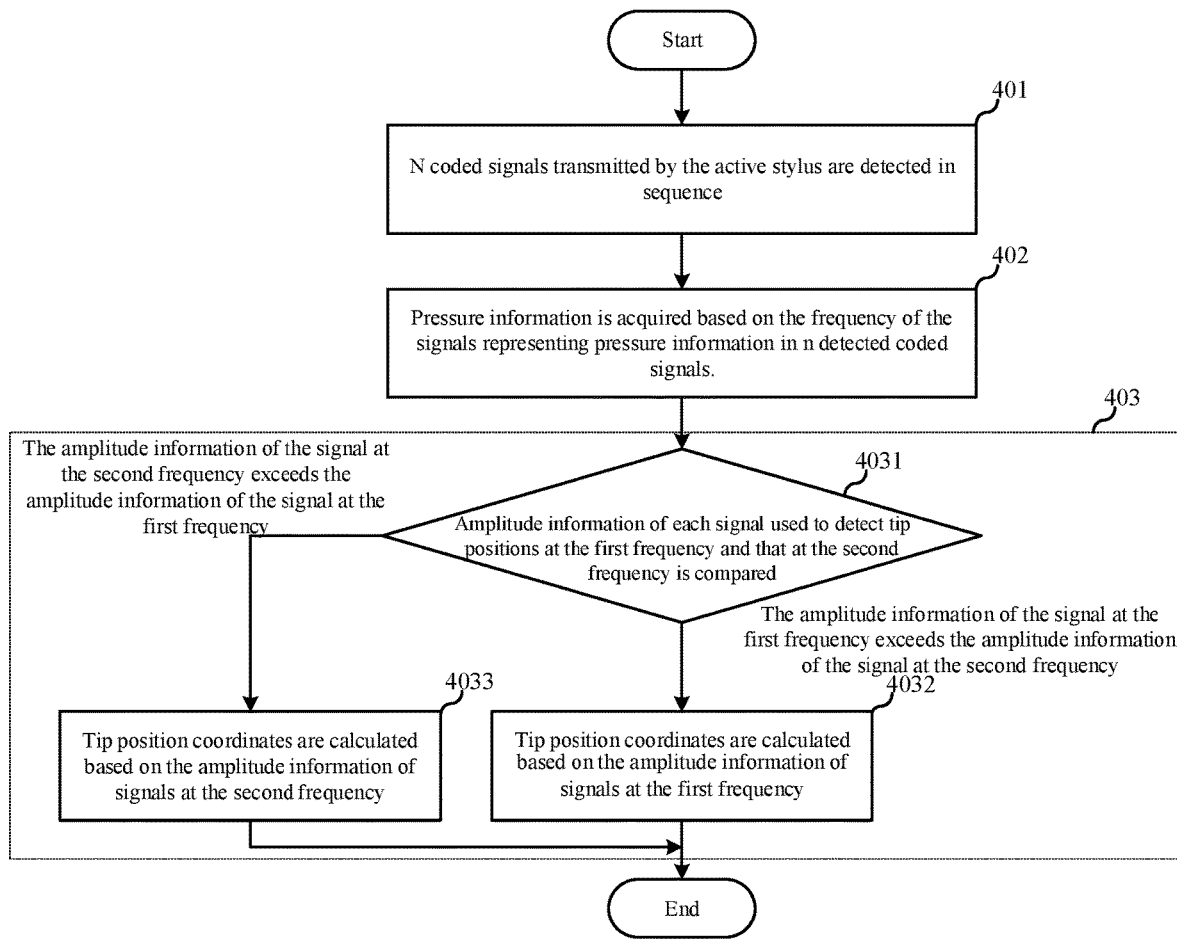
FIG. 21 is a detailed flow chart of a method for receiving a signal in the fourth embodiment of the present disclosure, in which step 403 is described in more details.

In one example, coded signals at the first and second frequency may be detected at the same time by setting detection time slices, as shown in FIG. 21. Step 403, that is, the coordinates of the tip position are acquired based on the amplitude information of the signals used to detect tip positions in detected coded signals, includes the following sub-steps.

In sub-step 4031, with respect to each signal used to detect tip positions, amplitude information of the signal at the first frequency and that at the second frequency is compared. If the amplitude information of the signal at the first frequency exceeds that of the signal at the second frequency, sub-step 4032 is performed; otherwise, sub-step 4033 is performed.

In sub-step 4032, the coordinates of the tip position are calculated based on the amplitude information of signals at the first frequency.

In sub-step 4033, the coordinates of the tip position are calculated based on the amplitude information of signals at the second frequency.

Specifically, with respect to any coordinate code, the two coded signals corresponding to the coordinate code are detected by the driving channel Y and the sensing channel X, respectively. The driving channel Y, after detecting the signal at the first frequency F1 and that at the second frequency F2, acquires the greatest amplitude Data1 of F1 in all amplitude information of F1 and that, Data2, of F2, and compares the Data1 and the Data2. When Data1 is greater than Data2, the active stylus 100 transmits the signal at the first frequency, so the x-coordinate of the tip position is calculated based on the amplitude of the signal at the first frequency. When Data1 is small than Data2, the active stylus 100 transmits the signal at the second frequency, so the x-coordinate of the tip position is calculated based on the amplitude of the signal at the second frequency. The same goes for the Sensing Channel X. When Data1 is greater than Data2, the active stylus 100 transmits the signal at the first frequency, so the y-coordinate of the tip position is calculated based on the amplitude of the signal at the first frequency. When Data1 is smaller than Data2, the active stylus 100 transmits the signal at the second frequency, so the y-coordinate of the tip position is calculated based on the amplitude of the signal at the second frequency.

It should be noted that this embodiment does not impose any restriction on the performing sequence of step 402 and step 403.

This embodiment can be implemented in coordination with the first to the third embodiments as they correspond to each other. Technical details described in the first to the third embodiments remain valid in this embodiment, and technical effects that can be realized in the first to the third embodiments can also be realized in this embodiment, so they will not be repeated here. Correspondingly, technical details described in the embodiment can also be applied to the first to the third embodiments.

Compared to existing technologies, codes representing pressure information and used to detect tip positions are acquired based on detected pressure information in this embodiment, coded signals respectively corresponding to n code bits in the code are generated, that is, n coded signals are acquired, and with respect to different codes, n coded signal are transmitted by a different transmitting method. For a binary code, there are two code values in each of the n code bits, and each of the n coded signals is transmitted at the preset first or second frequency (that is, a coded signal with code value 0 corresponding to the code bit is transmitted at the first frequency, and that with code value 1 is transmitted at the second frequency) to allow the touch screen to identify the code value of each code bit according to the frequency of the detected signal when the touch screen detects the coded signal, so that the pressure information can be transmitted, and the code bits representing pressure information can be used to detect tip positions. In this way, the coordinates of tip positions can be transmitted without extra code bits, and can be acquired by the touch screen during pressure information detection, which reduces detection time of the touch screen and allows the active stylus to transmit more coordinates of tip positions and the touch screen to detect more coordinates of tip positions at a unit of time, thus improving the contact reporting rate. For a ternary code, there are three code values in each of the n code bits, and each of the n coded signals representing the pressure information is transmitted at the preset first or second frequency, or is prohibited to be transmitted. In this way, when the pressure information is transmitted, higher pressure degrees can be represented by fewer code bits, thus shortening the time of transmitting pressure information to allow the active stylus to transmit more coordinates of tip positions at a unit of time, so as to improve the contact reporting rate.

The fifth embodiment of the present disclosure relates to a processor chip applied to the method for receiving a signal in the first to the third embodiments.

The sixth embodiment of the present disclosure relates to an active stylus that includes the processor chip described in the fifth embodiment.

The seventh embodiment of the present disclosure relates to a touch screen including at least one processor, and a memory connected and in communication with the at least one processor. In particular, the memory stores instructions executable by the at least one processor, and the instructions, when executed by the at least one processor, cause the at least one processor to perform the method for receiving a signal in the fourth embodiment.

The ordinary skill in this art may understand that all embodiments are specific examples for realizing the present disclosure, and in practical applications they may be changed and modified in forms and in details without departing from the spirit and the scope of the present disclosure.

What is claimed is:

1. A method for transmitting a signal, applied to active styli, comprising:
    acquiring, based on detected pressure information, codes representing pressure information and used to detect tip positions, where the codes comprise n code bits, n being an integer greater than 1; wherein the n code bits further comprise a check code bit;
    generating n coded signals respectively corresponding to the n code bits; and
    transmitting each coded signal representing pressure information in the coded signals at a preset first frequency or second frequency or prohibiting transmission of each coded signal representing pressure information in the coded signals;
    wherein the first frequency, the second frequency and prohibited transmission of the n coded signals relate to the pressure information.

2. The method for transmitting a signal according to claim 1, wherein a part of the n code bits serve as n pressure code bits representing the pressure information, and another part of the n code bits serve as a coordinate code bit used to detect tip positions.

3. The method for transmitting a signal according to claim 1, wherein each coded signal used to detect tip positions in n coded signals is transmitted at the first frequency or second frequency.

4. The method for transmitting a signal according to claim 1, wherein acquiring, based on detected pressure information, codes representing pressure information and used to detect tip positions comprises:

acquiring, based on detected pressure information and pressing signals of function buttons, codes representing the pressure information and pressing signals and used to detect tip positions.

5. The method for transmitting a signal according to claim 4, wherein any of the code bits serves as a key code bit representing the pressing signals.

6. The method for transmitting a signal according to claim 5, wherein the active stylus comprises two function buttons, and the pressing signals of the two function buttons correspond to the key code bit with different code values respectively.

7. The method for transmitting a signal according to claim 1, wherein before acquiring, based on detected pressure information, the codes representing pressure information and used to detect tip positions, further comprising:

in response to a synchronizing signal transmitted by the touch screen, acquiring the delay time from the synchronizing signal; start timing when the synchronizing signal ends; and entering the step of acquiring, based on detected pressure information, codes representing pressure information and used to detect tip positions when the timing length reaches a preset delay time.

8. The method for transmitting a signal according to claim 2, wherein the first frequency, the second frequency and prohibited transmission correspond respectively to the pressure code bits with different code values.

9. The method for transmitting a signal according to claim 1, wherein the codes are ternary.

10. The method for transmitting a signal according to claim 9, wherein prohibited transmission corresponds to the pressure code bit with a ternary code value "0", the first frequency corresponds to the pressure code bit with a ternary code value "1", and the second frequency corresponds to the pressure code bit with a ternary code value "2".

11. The method for transmitting a signal according to claim 2, wherein two coordinate code bits corresponding to the coordinate code are adjacent to each other in the n code bits.

12. A method for receiving a signal, applied to touch screens, comprising:

detecting, in sequence, n coded signals transmitted by the active stylus in sequence where the n coded signals have a preset first frequency or second frequency or are prohibited to be transmitted; wherein the n coded signals respectively correspond to n code nodes, and the n code bits further comprise a check code bit;

acquiring pressure information based on frequency and prohibited transmission of signals representing pressure information in n detected coded signals; and acquiring coordinates of tip positions based on amplitude information of signals used to detect tip positions in n detected coded signals.

13. The method for transmitting a signal according to claim 12, wherein acquiring pressure information based on the frequency and prohibited transmission of signals representing pressure information in the n detected coded signals, comprises:

with respect to each signal representing pressure information, acquiring the code values of the code bits of the signal corresponding to the pressure information based on the frequency and prohibited transmission of the signal.

14. The method for receiving a signal according to claim 12, wherein the touch screen comprises driving channels and sensing channels, wherein detecting, in sequence, n coded signals transmitted by the active stylus comprises:

detecting the n coded signals in sequence by the driving channels and the sensing channels.

15. The method for receiving a signal according to claim 14, wherein the driving channel comprises multiple driving electrodes, the sensing channel comprises multiple sensing electrodes, and the amplitude information comprises the amplitudes of the signal detected by all driving electrodes and those detected by all sensing electrodes;

acquiring the coordinates of tip positions based on the amplitude information of signals used to detect tip position in n detected coded signals, comprises:

comparing the amplitude of the signal with the threshold value; if the amplitude of the signal is smaller than the threshold value, no transmission of the coded signals by the active stylus is determined; if the amplitude is larger than the threshold value, transmission of the coded signals by the active stylus is determined;

with respect to signals used to defect tip positions, the driving electrode corresponding to the signal with the maximum amplitude and the sensing electrode corresponding to the signal with the maximum amplitude are used to calculate the coordinates of the tip position.

16. The method for receiving a signal according to claim 12, wherein acquiring coordinates of tip positions based on the amplitude information of the signals used to detect tip positions in n detected coded signals further comprises:

with respect to each signal used to detect tip positions, comparing the amplitude information of the signal at the first frequency and that of the signal at the second frequency;

if the amplitude information of the signal at the first frequency exceeds that of the signal at the second frequency, the amplitude information of the signal at the first frequency is used to calculate the coordinates of the tip position;

if the amplitude information of the signal at the second frequency exceeds that of the signal at the first frequency, the amplitude information of the signal at the second frequency is used to calculate the coordinates of the tip position.

17. A processor chip, wherein the processor chip is configured to perform the method for transmitting a signal in claim 1.

18. An active stylus, comprising: the processor chip according to claim 17.

19. A touch screen, comprising:

at least one processor; and, a memory connected and in communication with the at least one processor;

wherein the memory stores instructions executable by the at least one processor, and the instructions, when executed by the at least one processor, cause the at least one processor to perform the method for receiving a signal in claim 12.

* * * * *